(12) United States Patent
Faure et al.

(10) Patent No.: US 8,571,258 B2
(45) Date of Patent: Oct. 29, 2013

(54) METHOD OF TRACKING THE POSITION OF THE HEAD IN REAL TIME IN A VIDEO IMAGE STREAM

(75) Inventors: Julien Faure, Lannion (FR); Grégory Pallone, Lannion (FR)

(73) Assignee: France Telecom, Paris (FR)

( * ) Notice: Subject to any disclaimer, the term of this patent is extended or adjusted under 35 U.S.C. 154(b) by 871 days.

(21) Appl. No.: 12/223,536

(22) PCT Filed: Jan. 31, 2007

(86) PCT No.: PCT/FR2007/000176
§ 371 (c)(1),
(2), (4) Date: Sep. 26, 2008

(87) PCT Pub. No.: WO2007/090945
PCT Pub. Date: Aug. 16, 2007

(65) Prior Publication Data
US 2009/0129631 A1    May 21, 2009

(30) Foreign Application Priority Data

Feb. 7, 2006    (FR) ...................................... 06 01080

(51) Int. Cl.
*G06K 9/00*    (2006.01)
*H04N 5/225*   (2006.01)

(52) U.S. Cl.
USPC .......................................... 382/103; 348/169

(58) Field of Classification Search
USPC ......... 382/100, 103, 107, 115, 118, 159, 168, 382/173, 181, 190, 194, 199, 203, 209, 291, 382/104; 342/52, 90, 176; 345/158; 348/152–155, 169–172, 239; 463/36–39; 702/104, 127, 150, 153, 702/182
See application file for complete search history.

(56) References Cited

U.S. PATENT DOCUMENTS 6,240,198 B1 * 5/2001 Rehg et al. ..................... 382/103
6,937,745 B2 * 8/2005 Toyama ........................ 382/103
7,809,162 B2 * 10/2010 Steinberg et al. ............. 382/103
(Continued)

OTHER PUBLICATIONS

A.S. Micilotta and Bowden: "view-based Location and Tracking of Body Parts for Visual Interaction", Proceedings on British Machine Vision Conf., vol. 2, Sep. 2004, pp. 849-859, XP002392458.

(Continued)

*Primary Examiner* — Hadi Akhavannik
*Assistant Examiner* — Mehdi Rashidian
(74) *Attorney, Agent, or Firm* — Knobbe Martens Olson & Bear LLP

(57) ABSTRACT

The invention relates to a method of tracking the position of the bust of a user on the basis of a video image stream, said bus comprising the user's torso and head, the method comprising the determination of the position of the torso on a first image, in which method a virtual reference frame is associated with the torso on said first image, and in which method, for a second image, a new position of the virtual reference frame is determined on said second image, and, a relative position of the head with respect to said new position of the virtual reference frame is measured by comparison with the position of the virtual reference frame on said first image, so as to determine independently the movements of the head and the torso.

9 Claims, 2 Drawing Sheets

(56) References Cited

U.S. PATENT DOCUMENTS

| | | | |
|---|---|---|---|
| 7,940,956 B2* | 5/2011 | Kinoshita et al. | 382/103 |
| 7,953,246 B1* | 5/2011 | Tu et al. | 382/103 |
| 2003/0012408 A1* | 1/2003 | Bouguet et al. | 382/103 |
| 2003/0123754 A1* | 7/2003 | Toyama | 382/291 |
| 2005/0271279 A1* | 12/2005 | Fujimura et al. | 382/203 |
| 2007/0127811 A1* | 6/2007 | Luo | 382/159 |
| 2008/0129581 A1* | 6/2008 | Douglass et al. | 342/52 |
| 2011/0293129 A1* | 12/2011 | Dillen et al. | 381/370 |
| 2012/0086801 A1* | 4/2012 | Larsen | 348/135 |

OTHER PUBLICATIONS

Ju SX et al.: "Cardboard People: A Parameterized Model of Articulated Image Motion"—Auyomatic Face and Gesture Recognition, 1996, Proceedings of the Second Intern'l Conf. on Killington Vt, USA Oct. 14-16, 1996, Los Alamitos, CA IEEE Comput. Soc., pp. 38-44, XP010200397, ISBN: 0-8186-7713-9, Abstract; Figs. 1-3.

Wang JJ et al., "Video Analysis of Human Dynamics—A Survey", Real-Time Maging, Acad. Press Ltd, GB, vol. 9, No. 5, Oct. 2003, pp. 320-345, XP004472531, ISSN: 1077-2014.

Youding Zhu et al. "3D Head Pose Estimation With Optical Flow and Depth Constraints," 3-D Digital Imaging and Modelling, 2003, 3DIM 2003, Proceedings, 4$^{th}$ Int'l Conf., Oct. 2003, Piscataway, NJ, ISA, IEE, pp. 211-216, XP010662697, ISBN: 0-7695-1991-1—Abstract.

Rana EL kaliouby, peter robinson: "Real-Time Inference of Complex Mental States from Facial Expressions and Head Gestures," Real-Time Vision for Human-Computer Interaction [Online] 2005, pp. 181-200, XP002434984 Springer US-ISBN: 978-0-387-27697-7, Retrieved from the Internet: URL:http://www.cleam.ac.uk/{pr10/publicatiosn/rtv4hci05.pdf>[Retrieved on May 24, 2007], Fig. 4.

* cited by examiner

METHOD OF TRACKING THE POSITION OF THE HEAD IN REAL TIME IN A VIDEO IMAGE STREAM

This application is a 371 national stage entry of International Application No. PCT/FR2007/000176, filed on Jan. 31, 2007 and claims priority to French Patent Application No. 06 01080, filed on Feb. 7, 2006, both of which are hereby incorporated by reference in their entirety.

The present invention relates generally to the processing of video images generated by a camera, and more particularly real time tracking of the position of the upper body of a person on images generated by a camera.

The present invention also relates to the measurement of movements of an individual, in particular in the context of what is called "virtual reality", in which the movements of the individual are interpreted by computer means in order, for example, to be used for subsequent applications.

The measurement of movements of the head of an individual, in particular from simple image acquisition and processing means, comprises specific difficulties. Head-tracking systems based on a stream of images taken of the head of the individual generally use:

one or two image acquisition devices, such as cameras, to capture the images; and data processing means such as a computer to process the images using specific algorithmic processes.

Systems of this type are known which follow a point, an area or an object in an image by locating and measuring the position of an object from one image to another. Systems working in real time may also obtain the position of an object in the image.

In the patent application US 2002/037 770 a user selects an object in the image. This object is then tracked from one image to another according to three measurements based on the color, the movement and the shape of the object to be tracked.

According to a different principle, which however leads to the same result, D. O. Gorodnichy, S. Malik and G. Rothdans in "Nouse: Use Your Nose as a Mouse—A New Technology for Hands-free Games and Interfaces", Proceedings of International Conference on Vision Interface, Calgary 2002, have designed software that locates the particular form of the nose in order to track its position from one image to another.

G. R. Bradski, in "Computer Vision Face Tracking for Use in a Perceptual Interface", Intel Technology Journal, 1998, also uses the color principle in order to locate the position of a face in the image from the camera. The image is filtered in order to obtain the probability distribution of the color that corresponds to the skin color (by means of a histogram). The center of gravity of this distribution provides the center of the face. The rolling of the head is provided by the calculation of distribution moments.

These examples enable the mouse cursor to be guided, their performance is very good in terms of speed but they do not allow a rotation of the head to be distinguished from a translation. The methods of tracking an image without a reference frame hence content themselves with locating the position alone and not the orientation of the face. The number of degrees of freedom measured is only equal to two, making them inefficient in particular for guiding the mouse cursor.

Other systems are known which reconstitute the position and orientation of three dimensional objects from two cameras or from one camera and a 3D model of the object.

The document U.S. Pat. No. 6,580,810 describes a method of reconstructing the face in three dimensions from one camera. Three significant points (for example the two eyes and the mouth) are located on the first image, these points forming a 3D triangle of which the position in space of the points is known. Then, for each captured image, the three characteristic points are located and their 2D coordinates calculated. The 3D model then undergoes rotations and translations in order to find the configuration that minimizes the error between the projection of the 3D model of the triangle and the 2D measurement.

The correspondence between a 3D model and a 2D image is also known from the patent application US 2003/012 408. A 3D model of the face obtained, for example, with two cameras is compared with the image obtained with one camera. An analysis of the main components allows the orientation and the position of the face to be determined.

These methods look for the correspondence between a 3D model that can undergo all sorts of transformations and a 2D image. The main disadvantage of this technique remains, however, obtaining the 3D model. Indeed, it implies that the latter is known and hence measured in advance. The use of generic 3D models also does not provide a satisfactory solution in terms of angular resolution.

In "Affordable 3D Face Tracking Using Projective Vision", by D. O. Gorodnichy, S. Malik and G. Roth, Proceedings of International Conference on Vision Interface, Calgary 2002, a 3D reconstruction from two cameras is described. Characteristic points are located on the two images, a transformation matrix is calculated. This matrix, called the fundamental matrix, enables a part of the image to be reconstituted in three dimensions and in real time from two video streams. This method copying vision requires two cameras. These methods of reconstruction in three dimensions use two cameras, making this reconstruction costly in terms of hardware and calculation time.

To date only the techniques making use of two cameras, or one camera and a 3D model, allow the orientation to be distinguished from translation of the head. These techniques remain complex and hence demand significant computing power to be applied in real time.

Finally, neural network techniques are known, but they require a learning phase and a processing time ill-suited to real time, such as for example the control of a video game.

An aim of the present invention is to propose a method enabling the orientation to be distinguished from translation of the head from a single video stream. Another aim of the present invention is to propose a method that is applicable in real time, i.e. to streams, for example, of more than 30 images per second. Finally, another aim of the present invention is to propose a method that allows the use of hardware available to the largest number of users, such as a single camera connected to an extended network or "webcam" for example.

Hence, according to a first aspect, the invention proposes a method of tracking the position of the upper body of a user from a video image stream, the upper body comprising the torso and the head of the user, the method comprising a determination of the position of the torso in a first image, in which method:

a virtual reference frame is associated with the torso in the first image;

and in that, for a second image:

a new position of the virtual reference frame is determined in the second image; and a relative position of the head relative to the new position of the virtual reference frame is measured by comparison with the position of the virtual reference frame in the first image, in order to determine independently the movements of the head and of the torso.

Hence, due to the virtual reference frame, the invention can be used without calibration or without a 3D model of the user that has been previously acquired or drawn, for example, from a library. These measurements are available in real time from a single video stream.

Although the invention requires the use of object tracking algorithms, it remains independent of the type of algorithm employed.

In relation to known techniques that track the position of the head from a video stream, the invention consists in adding and in tracking a virtual reference frame (positioned in the image of the torso of the user) so as to differentiate the rotations from translations of the head. Moreover, the invention does not require an algorithm using learning or calibration.

In a preferred implementation of the method according to the invention, the head of the user comprises the face of the user, and in order to deduce from this the relative position of the head at least one position of the face is measured relative to the new position of the reference frame in the current image.

The face may easily be recognized by a particular point such as, for example, the nose, the eyes or the mouth, the neck, or by an external object such as a cap placed on the head, using techniques such as that previously mentioned.

The comparison of movement of the face relative to the torso allows in particular the position of the head to be determined, which position may be characterized for example by the azimuth, the elevation, and horizontal and vertical translations of the latter.

In the preferred embodiments of the invention, it is optionally possible to use in addition one and/or the other of the following provisions:
- the position of the face of the user is determined in the first image, and from this the position of the torso in said first image is deduced in order to associate a virtual reference frame with the first image;
- the position of the torso is determined vertically from the position of the face;
- the relative position of the head is measured from a comparison between the positions of the torso and of the face in the first image, and the new positions of the torso and of the face in the second image;
- the head includes the neck, and the relative position of the head is characterized by:
  - an elevation corresponding to the rotation of the head between the first and the second image, measured in the plane of symmetry of said head;
  - an azimuth corresponding to the rotation of the head between the first and the second image, measured about an axis defined by the neck of the user; and
  - a translation of the head between the first and the second image;
- the relative position of the head is given by the expressions:

$$P_x = T_x - T_{x0}$$

$$P_y = T_y - T_{y0}$$

$$EI = \frac{\pi}{2} - \arccos([(V_{y0} - T_{y0}) - (V_y - T_y)] \cdot C_1^{-1})$$

$$Az = \frac{\pi}{2} - \arccos\left(\left[\frac{(V_{x0} - T_{x0}) - (V_x - T_x)}{\cos(EI)}\right] \cdot C_2^{-1}\right)$$

with $T_{x0}$ and $T_{y0}$ the coordinates representing the position of the torso in the first image;

$T_x$ and $T_y$ the coordinates representing the position of the torso in the second image;

$V_{x0}$ and $V_{y0}$ the coordinates representing the position of the face in the first image;

$V_x$ and $V_y$ the coordinates representing the position of the face in the second image;

these coordinates being measured in a shared reference frame linked with the horizontal and vertical axes of the first and second images; and C1 and C2 constants such that:

$$C_1 > [(V_{y0} - T_{y0}) - (V_y - T_y)]$$

$$C_2 > \left[\frac{(V_{x0} - T_{x0}) - (V_x - T_x)}{\cos(EI)}\right] \text{ and } -\frac{\pi}{2} < EI < \frac{\pi}{2}$$

with
- $P_x$ the horizontal component of the translation of the head;
- $P_y$ the vertical component of the translation of the head;
- El the elevation; and
- Az the azimuth; and
- the coordinates representing the position of the face and of the torso in the first image are the coordinates of the center of gravity of a first cluster of points defined on the face and the coordinates of the center of gravity of a second cluster of points defined on the torso, the coordinates representing the position of the face and of the torso in the second image being the coordinates of the centers of gravity of the first and second clusters of points considered in their new position in said second image; and
- the first image is a calibration image and the second image is a current image from the video image stream.

The invention also relates to a system for tracking the position of the upper body of a user from a video image stream, the upper body comprising the head and the torso of the user, the system comprising:
- a video-image capture system for generating at least one first image and a second image of the upper body of the user;
- memory; and
- a processing unit connected with the video-image capture system, the processing unit making use of instructions available in the memory to implement the method according to the invention.

The invention furthermore comprises a computer program product designed to be executed in a memory of the processing unit of a computer system, the program comprising instructions for the implementation of the method according to the invention when it is executed in the processing unit.

Other features and advantages of the invention will again appear on reading the following description. This is purely illustrative and should be read with regard to the drawings in which.

The method according to the invention may be implemented using means for capturing a video image, for example a webcam. It also requires calculation means such as a processor, and may be implemented by a computer.

Figure 3:
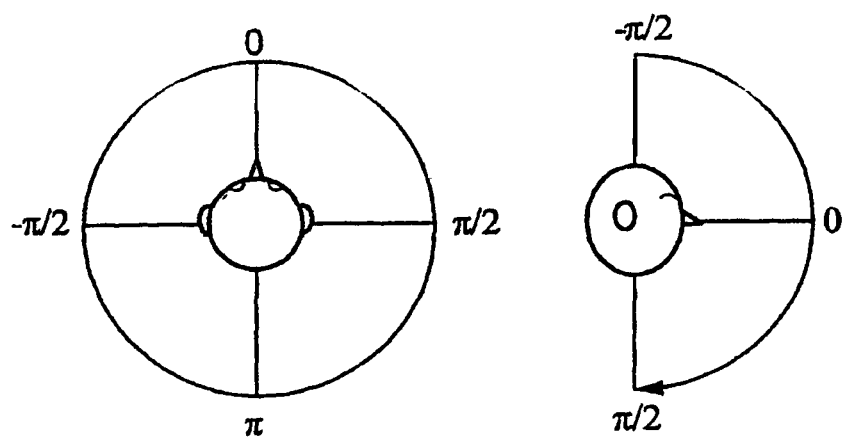
FIG. 3 is an illustration of the head of a user in order to define the azimuth and the elevation of said head.

In the remainder of the exposition, the upper body of the user is understood to mean the whole comprising the head and the torso. The head furthermore comprises the face of the user. The position of the head may be described using its azimuth Az, its elevation El, and its horizontal $P_x$ and vertical $P_y$ displacements or translations. As represented in FIG. 3, the azimuth corresponds to the rotation of the head about the axis constituted by the neck of the user, zero rotation corresponding to the neutral position of the neck. The elevation, also defined in FIG. 3, corresponds to the rotation of the head in the plane of symmetry of the face, zero rotation also corresponding to the neutral position of the neck. The coordinates mentioned are determined according to a frame of reference common to all the images of the video stream, on axes corresponding for example to the horizontal and vertical edges of each image. Finally, translation is understood to mean rectilinear displacement of the head; it has a horizontal component and vertical component in directions parallel to the horizontal and vertical edges of the video image respectively.

Figure 1:
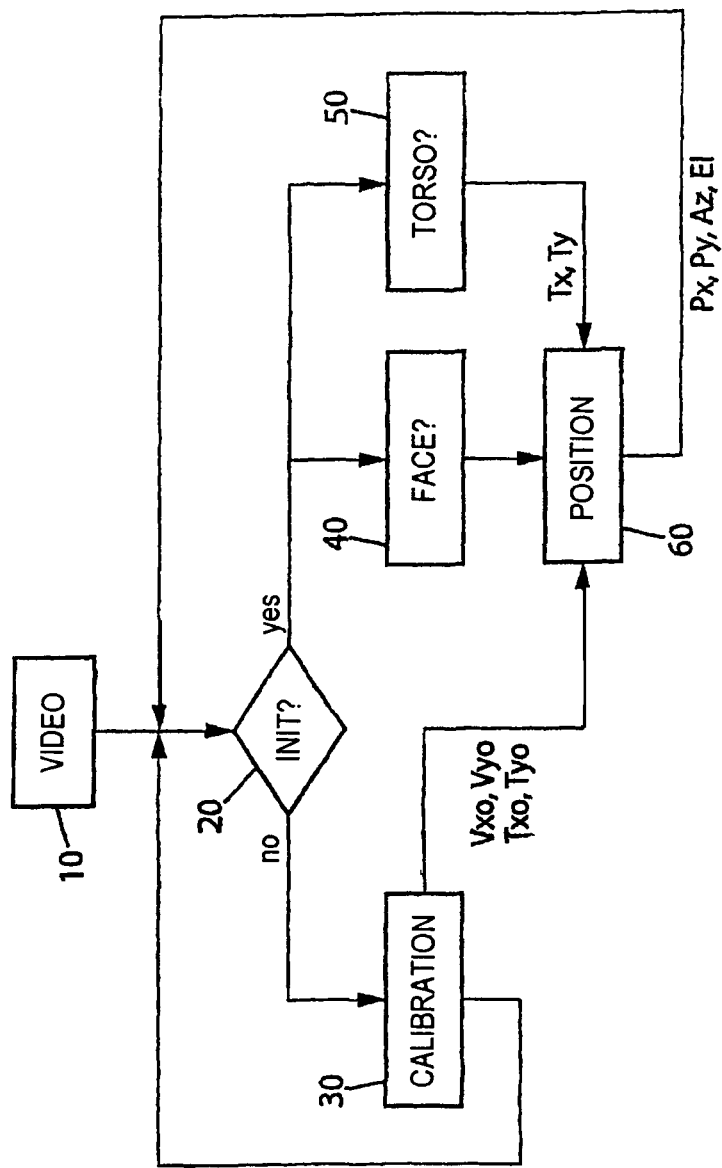
FIG. 1 is a diagram of the steps of an implementation of the method according to the invention.

FIG. 1 shows a diagram of the steps of an implementation of the method according to the invention. A camera, for example a webcam, generates a stream of video images, and a first video image 10 is captured by the camera.

In a first step 20 whether the method has been initialized is checked. In the negative case, a virtual reference frame is associated with the torso in the first image 10 in the course of a step 30. This step 30 includes the determination of the position of the torso of the user. This position may, for example, be characterized by the coordinates $T_{x0}$ and $T_{y0}$, coordinates representing the position of the torso and measured in the first image 10. These coordinates correspond, for example, to the coordinates of a precise point of the torso located in the plane of the first image.

In the remainder of the exposition, the coordinates or the translations may be measured in pixels or in distance (in meters for example), while the rotations are expressed in degrees or in radians.

Various techniques may be used to determine the position of the torso. In a preferred embodiment, the position of the face of the user in the first image is determined at a first time, for example by means of $V_{x0}$ and $V_{y0}$, the coordinates representing the position of the face in the first image of the face, and measured in the plane of the first image. This determination of $V_{x0}$ and $V_{y0}$ may be carried out:

- either manually, the user then positions himself at the center of the image and actuates the initialization command, such as for example a touch of the keyboard. A particular point, such as the nose or other locatable point on the face, is then located;
- or by using a face recognition algorithm, such as, for example, the CAMSHIFT algorithm developed by G. R. Bradski and described in detail in "Computer Vision Face Tracking for Use in a Perceptual User Interface" taken from the Intel Technology Journal, 1998.

The torso is then considered vertical to the face and in the lower area of the image capture. It is located by the coordinates $T_{x0}$ and $T_{y0}$.

The position of the head is then initialized. If it is characterized by its azimuth, its elevation and two translations, these data are initialized at a value zero.

Once the position of the torso has been determined, a virtual reference frame is associated with the torso in the first image 10. It hence allows the head to be positioned relative to the torso.

Once the step 30 has been carried out, the position of the head and of the torso is determined in the following manner for each subsequent current image of the video stream.

A second image is generated by the camera. Having already carried out the initialization step 20, the new position of the head and of the torso are determined for this second image in the course of the steps 40 and 50 respectively. These two steps are identical and independent. They may consist in respectively obtaining:

- the new position of the face $V_x$ and $V_y$, coordinates representing the position of the head in the second image, in the course of step 40; and
- the new position of the torso by means of $T_x$ and $T_y$, coordinates representing the position of the torso in the second image, in the course of step 50.

Optical flow algorithms, such as that described by J.-Y. Bouguet in "Pyramidal Implementation of the Lucas Kanade Feature Tracker Description of the Algorithm", Intel Corporation, 2000, may, for example, track the movement of pixels in the area of the face and in the area of the torso relative to the preceding image or the calibration image.

The new position of the torso $T_x$ and $T_y$ allows a new position of the virtual reference frame to be determined.

In a subsequent step 60, a relative position of the head is calculated relative to the new position of the virtual reference frame, by comparison with the position of the virtual reference frame in the first image, to determine independently the movements of the head and of the torso.

In a preferred embodiment, at least one position of the face is measured relative to the new position of the reference frame in the second image in order to deduce from this the relative position of the head.

The calculation is carried out thus. The movements of the head are characterized by the 4 degrees of freedom previously mentioned, i.e. the azimuth Az, the elevation El, and its horizontal $P_x$ and vertical $P_y$ translations. The calculations take account of the projection of the rotation of the head onto a vertical plane and a horizontal plane.

Figure 2:
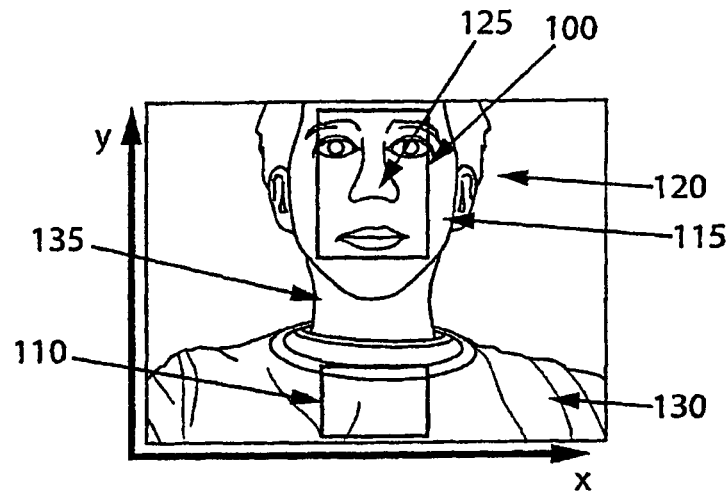
FIG. 2 is an illustration on a video image of the implementation of the method according to the invention.

FIG. 2 shows a current image of the video stream with which a horizontal axis (axis of abscissas XX') and a vertical axis (axis of ordinates YY') are associated, and which are respectively parallel to the sides of the image. The head 120, the face 115, the torso 130, the neck 135 and the nose 125 of the user can be seen.

The relative position of the head 120 is measured from a comparison between the positions of the torso 130 and of the face 115 in the first image, and the new positions of the torso 130 and of the face 115 of the user in the second image.

The translation of the torso 130 is defined by its horizontal and vertical components with the following equations:

$$P_x = T_x - T_{x0} \tag{1.1}$$

$$P_y = T_y - T_{y0} \tag{1.2}$$

with $P_x$ the horizontal translation of the head 120 between the first and the second image;

$P_y$ the vertical translation of the head 120 between the first and the second image.

Hence, the translation of the head is defined to be identical to the translation of the torso. This definition allows the displacement of the torso 130 to be factored out and the calculation of rotations of the head to be simplified.

The elevation and azimuth values, shown in FIG. 3, are respectively given by the following equations:

$$EI = \frac{\pi}{2} - \arccos([(V_{y0} - T_{y0}) - (V_y - T_y)] \cdot C_1^{-1}) \tag{2}$$

-continued $$Az = \frac{\pi}{2} - \arccos\left(\left[\frac{(V_{x0} - T_{x0}) - (V_x - T_x)}{\cos(El)}\right] \cdot C_2^{-1}\right) \quad (3)$$

with:
El the angle corresponding to the elevation of the head, i.e. the rotation of the head in the plane of symmetry of said head between the first and second image;
Az the angle corresponding to the azimuth of the head, i.e. the rotation of the head about the axis constituted by the neck 135 between the first and second image;
where $C_1$ is a constant such that $C_1 > [(V_{y0}-T_{y0})-(V_y-T_y)]$ and $C_2$ is a constant such that:

$$C_2 > \left[\frac{(V_{x0} - T_{x0}) - (V_x - T_x)}{\cos(El)}\right] \text{ with } -\frac{\pi}{2} < El < \frac{\pi}{2}.$$

If the positions of the face and of the torso are measured in pixels, the constants $C_1$ and $C_2$ are also in pixel units. The constant $C_1$ is equal to the distance (in pixels) between the initial position of the center of the head relative to the upper body $(V_{y0}-T_{y0})$ and the position of the head relative to the upper body $(V_y-T_y)$ when the latter has an elevation of 90° and an azimuth of 0°. The constant $C_2$ is equal to the distance (in pixels) between the initial position of the center of the head relative to the upper body $(V_{x0}-T_{x0})$ and the position of the head relative to the upper body $(V_x-T_x)$ when the latter has a zero elevation and an azimuth of 90°.

Hence, using the method according to the invention, the relative position of the head relative to the torso of the individual is characterized in terms of its elevation El, its azimuth Az, and translations $P_x$ and $P_y$ between the first and the second image. This characterization is independent of the tracking algorithm(s) selected. Moreover, these are four degrees of freedom that define the relative position of the head relative to the torso, in contrast to the known methods which limit themselves to two degrees of freedom. In one embodiment, the relative position of the head relative to the torso of the individual is characterized in terms of at least one element from among its elevation El, its azimuth Az, and the translations $P_x$ and $P_y$ between the first and the second image.

In a further embodiment, the first image may be replaced in the course of the processing of the video image stream by a new image in which the positions of the face $V_{x0}$ and $V_{y0}$ and of the torso $T_{x0}$ and $T_{y0}$ are determined. This change in the first image may be deliberate or automated, when for example the system implementing the method determines too large a deviation in position of the upper body between the first and the second image.

In an additional embodiment, the first image is a calibration image while the second image is a current image from the video stream. A calibration image is understood to be a reference image, identical with each processing of a new current image from the video stream. Hence, the movements of the head in a current image are calculated by comparison with the same calibration image. Using this terminology, the change in the first image from the preceding embodiment amounts to a change in the calibration image. A particular exemplary embodiment will be described below. This example may be implemented using functions from the Intel® OpenCV libraries alone.

In a first step, the user places his or her face at the center of a rectangle and issues, for example by keyboard, the initialization command. The camera captures a first image, the calibration image, represented in FIG. 2. A plurality of virtual points is located on the part delimited by the rectangle 100 seen in FIG. 2 and corresponding to an area around the nose 125. Their positions may be determined by the algorithm developed by J. Shi and C. Tomasi, and presented in "Good Features to Track", IEEE Computer Society Conference on Computer Vision and Pattern Recognition (CVPR 94), Seattle, 1994. An equivalent number of virtual points is positioned in a second rectangle 110 vertical to the face 115, as shown in FIG. 2. This number of points corresponds to the torso of the user. The width of the second rectangle and its horizontal position are the same as those of the first rectangle. Its height is equal to a fraction, here $\frac{1}{16}^{th}$, of the height of the image. The second rectangle is positioned at the base of the image. The centers of gravity of the two clusters of points contained in each rectangle, with the respective coordinates $(V_{x0}, V_{y0})$ and $(T_{x0}, T_{y0})$, are then calculated. They correspond to the position of the face and of the torso respectively in the first image.

For each image the new position of points is calculated for a current image by using a, previously mentioned, pyramidal implementation of the Lucas-Kanade algorithm.

In a preferred embodiment, the stability of the method is verified in a further step carried out after determining the new position of the virtual points.

For each cluster of points, if the new position of one of the points measured in the current image moves too far away from the center of gravity of the corresponding cluster, this virtual point is repositioned at the center of gravity. The surface of the area for which the points are not repositioned is equivalent to the rectangle used in initialization.

The new center of gravity is calculated from the nonrepositioned points. The coordinates of the center of gravity linked with the face are $V_x$ and $V_y$, while the coordinates of the center of gravity linked with the torso are $T_x$ and $T_y$.

The translations $P_x$ and $P_y$, along with the azimuth and the elevation are calculated according to the equations (1.1), (1.2), (2) and (3) respectively. The constants $C_1$ and $C_2$ are, for example, equal to 70 pixels for an image width of 340 pixels. These values allow the exact values of the azimuth and of the elevation to be obtained for a person positioned 50 cm from the camera. For other distances between the user and the camera, the measured values are then linearly proportional to the azimuth and to the elevation.

In a particular embodiment, 1D Kalman filters may be used to stabilize the calculated values. The input values for the filters are then directly the azimuth Az, the elevation El and the two translations $P_x$ and $P_y$.

Hence, the invention aims at a method of tracking the upper body of a user which is fast and effective and which enables the orientation of the head in azimuth and in elevation to be obtained, along with its lateral and vertical translations, from a single video stream (for example, a webcam) in real time (namely 30 or more images per second). The method according to the invention enables a virtual reference frame to be positioned on the torso of the user, which allows rotations to be differentiated from translations of the head.

The applications relevant to this invention are in the fields of telecommunications and leisure. The effectiveness of the method allows the use of measurements carried out in virtual reality and in particular during applications using sound spatialization techniques and in particular binaural techniques. The invention may be used as an additional control when using video games, in particular games in the first person, or first person shooter games (these are games in which a player "is" a figure in the game, hearing and seeing what this figure hears and sees). The method may also serve to guide the mouse with the head and may hence be a valuable aid to disabled people. It is also possible to envision using the results of the method according to the invention to seek to optimize the webcam, the position of the head allowing an orientable webcam to be controlled thanks to a motorized system depending on the new position of the head of the user.

Another advantage of the invention is that the rotations measured are independent of translations.

The implementation of the method according to the invention shows that performance improvements that result from it enable the use of less costly video capture hardware such as standard webcams. The method enables a real time measurement (at least 30 images per second) without saturation of the processor (5% to 20% of a 3 GHz Pentium IV with a resolution from 160×120 to 320×240 pixels).

Another advantage of the present invention lies in the fact that its simplicity enables the use of the highest performance (in terms of speed and cost reduction) calculation algorithms and allows its implementation in mobile phones to be envisioned. It also allows the coupling of position tracking with costly applications such as video games or applications using spatialized sound to be envisioned.

The invention also relates to a system for tracking the position of the upper body of a user from a video image stream, the upper body comprising the head and the torso of the user, the system comprising:
 a video-image capture system for generating at least one first image and a second image of the upper body of the user;
 memory; and
 a processing unit connected with the video-image capture system, the processing unit making use of instructions available in the memory to implement the method according to the invention.

The invention moreover relates to a computer program product designed to be executed in a memory of the processing unit of a computer system, the program comprising instructions for the implementation of the method according to the invention when it is executed in the processing unit.

The invention claimed is:

1. A method of tracking the position of the upper body of a user from a video image stream, said upper body comprising the torso and the head of the user, said head comprising the face of the user, the method comprising a determination of the position of the torso in a first image, wherein:
 a virtual reference frame is associated with the torso in said first image, wherein in order to associate a virtual reference frame with the first image, the position of the face of the user is determined in said first image, and from this the position of the torso in said first image is deduced;
 and, for a second image:
 a new position of the torso is determined in said second image;
 a new position of the virtual reference frame is determined in said second image; and
 a relative position of the head relative to said new position of the virtual reference frame is measured by comparison with the position of the virtual reference frame in said first image, wherein the relative position of the head is characterized by a rotation and a translation of the head between the first and the second images and wherein the translation of the head is defined to be identical to the translation of the torso; wherein the head of the user comprises the face of the user and at least one position of the face is measured relative to the new position of the reference frame in the second image in order to deduce from this the relative position of the head and wherein the relative position of the head is measured from a comparison between the positions of the torso and of the face in the first image, and the new positions of the torso and of the face in said second image.

2. The method as claimed in claim 1, wherein the position of the torso is determined vertically from the position of the face.

3. The method as claimed in claim 1, wherein the head includes the neck, and wherein the relative position of the head is characterized by:
 an elevation corresponding to the rotation of the head between the first and the second image, measured in the plane of symmetry of said head;
 an azimuth corresponding to the rotation of the head between the first and the second image, measured about an axis defined by the neck of the user; and
 a translation of the head between the first and the second image.

4. The method as claimed in claim 3, wherein the relative position of the head is given by the expressions:

$$P_x = T_x - T_{x0}$$

$$P_y = T_y - T_{y0}$$

$$EI = \frac{\pi}{2} - \arccos([(V_{y0} - T_{y0}) - (V_y - T_y)] \cdot C_1^{-1})$$

$$Az = \frac{\pi}{2} - \arccos\left(\left[\frac{(V_{x0} - T_{x0}) - (V_x - T_x)}{\cos(EI)}\right] \cdot C_2^{-1}\right)$$

with
$T_{x0}$ and $T_{y0}$ the coordinates representing the position of the torso in the first image;
Tx and Ty the coordinates representing the position of the torso in the second image;
Vx0 and Vy0 the coordinates representing the position of the face in the first image;
Vx and Vy the coordinates representing the position of the face in the second image;
these coordinates being measured in a shared reference frame linked with the horizontal and vertical axes of the first and second images; and
C1 and C2 are constants such that:

$$C_1 > [(V_{y0} - T_{y0}) - (V_y - T_y)]$$

$$C_2 > \left[\frac{(V_{x0} - T_{x0}) - (V_x - T_x)}{\cos(EI)}\right] \text{ and } -\frac{\pi}{2} < EI < \frac{\pi}{2}$$

with
Px the horizontal component of the translation of the head;
Py the vertical component of the translation of the head;
El the elevation; and
Az the azimuth.

5. The method as claimed in claim 4, wherein the coordinates representing the position of the face and of the torso in the first image are the coordinates of the center of gravity of a first cluster of points defined on the face and the coordinates of the center of gravity of a second cluster of points defined on the torso, the coordinates representing the position of the face and of the torso in the second image being the coordinates of the centers of gravity of the first and second clusters of points considered in their new position in said second image.

6. The method as claimed in claim 1, wherein the first image is a calibration image and the second image is a current image from the video image stream.

7. A system for tracking the position of the upper body of a user from a video image stream, the upper body comprising the head and the torso of the user, the system comprising:
- a video-image capture system for generating at least one first image and a second image of the upper body of the user;
- a memory; and
- a processing unit connected with said video-image capture system, said processing unit making use of instructions available in said memory to implement the method according to claim 1.

8. A non-transitory computer program product designed to be executed in a memory of the processing unit of a computer system, the program comprising instructions for the implementation of the method according to claim 1 when it is executed in the processing unit.

9. A method of tracking the position of the upper body of a user from a video image stream, said upper body comprising the torso and the head of the user, the method comprising the steps of:
- determining the position of the torso in a first image,
- associating a virtual reference frame with the torso in said first image;
- obtaining the new position of the torso in a second image,
- determining a new position of the virtual reference frame in said second image,
- measuring a relative position of the head relative to said new position of the virtual reference frame by comparison with the position of the virtual reference frame in said first image,
- determining independently the movements of rotation and translation of the head,
- wherein the translation of the head is defined to be identical to the translation of the torso, and wherein the translation of the torso is factored out; wherein the head of the user comprises the face of the user and at least one position of the face is measured relative to the new position of the reference frame in the second image in order to deduce from this the relative position of the head and wherein the relative position of the head is measured from a comparison between the positions of the torso and of the face in the first image, and the new positions of the torso and of the face in said second image.

* * * * *